United States Patent
VanLund et al.

(10) Patent No.: US 9,692,742 B1
(45) Date of Patent: Jun. 27, 2017

(54) THIRD PARTY AUDIO ANNOUNCEMENTS

(71) Applicant: Amazon Technologies, Inc., Seattle, WA (US)

(72) Inventors: Peter Spalding VanLund, Seattle, WA (US); Nicolas Anton Medhurst Hertl, Seattle, WA (US); Peter Paul Henri Carbon, Bellevue, WA (US); Vikram Kumar Gundeti, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 216 days.

(21) Appl. No.: 14/581,672

(22) Filed: Dec. 23, 2014

(51) Int. Cl.
*H04L 29/00* (2006.01)
*H04L 29/06* (2006.01)

(52) U.S. Cl.
CPC .................................. *H04L 63/08* (2013.01)

(58) Field of Classification Search
CPC .................................. G06F 21/30; H04L 9/32
USPC ............................................................ 726/9
See application file for complete search history.

(56) References Cited

U.S. PATENT DOCUMENTS

| 2013/0086670 A1* | 4/2013 | Vangpat | H04L 9/3213 726/8 |
| 2014/0230019 A1* | 8/2014 | Civelli | G06F 21/30 726/4 |

* cited by examiner

*Primary Examiner* — Brandon Hoffman
*Assistant Examiner* — Michael D Anderson
(74) *Attorney, Agent, or Firm* — Lee & Hayes, PLLC (57) ABSTRACT

A system enables end user devices to receive audio announcements from third party cloud-based resources. For example, the system may include a first party cloud-based resource providing tokens to the third party cloud-based resource in order to prevent the third party cloud-based resource from causing audio announcements to be output by user devices without authorization. In some cases, the tokens may be time based and prevent the third party cloud-based resource from causing audio announcements to be output by user devices after a predefined amount of time. In other examples, the tokens may be use based and prevent the third party cloud-based resource from causing the user device to output more than a predetermined number of audio announcements.

20 Claims, 7 Drawing Sheets

THIRD PARTY AUDIO ANNOUNCEMENTS

BACKGROUND

The use of whole home surround sound and ubiquitous computing devices is becoming more and more common. Many new homes and offices are built fully wired, while many old homes and offices utilize various wireless systems. Many different ways have been introduced to allow users to interact with computing devices, such as through mechanical devices (e.g., keyboards, mice, etc.), touch screens, motion, gesture, and even through natural language input such as speech. Furthermore, many of these devices are further connected to remote computing resources, such as cloud-based resources, that extend functionality afforded by the local devices.

As computing devices in homes and offices continue to evolve, users expect a more seamless and timely experience when interacting with cloud-based resources through local devices. Additionally, users expect a more robust set of services when interacting with cloud-based resources through local devices. In particular, users expect access to a variety of third party cloud-based resources without significant lag time.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

This disclosure includes techniques and implementations to improve performance of home and office computing systems when interacting with cloud-based resources. In particular, this disclosure describes ways to improve user experience when accessing cloud-based services offered by the cloud-based resources. For instance, a system may be configured to allow users to access cloud-based resources via a device physically situated in the home or office of the user. In some limited examples, the device may be configured to access the remote resources to perform database searches, locate and consume/stream other forms of entertainment (e.g., games, movies, electronic books, etc.), aid in personal management tasks (e.g., calendaring events, taking notes, etc.), assisting in online shopping, conducting financial transactions, and so forth.

In one example, the cloud-based resources accessible by the device may be non-downloadable software operating on first party cloud-based resources (e.g., resources for services made available by the device provider), as well as non-downloadable software operating on third party cloud-based resources (e.g., resources for services made available by a third party but accessible by users of the device). In this example, the device may be configured to output audio announcements into the physical environment when received from the first party cloud-based resources or a third party cloud-based resource.

For instance, in some implementations described herein, a user may request access to a particular third party cloud-based resource by speaking the phrase "please access car rental service". In some cases, the user may request specific car rental services, while in other cases the user may leave the selection of the particular service up to the system including the device, the first party cloud-based resources, and/or the third party cloud-based resources. In this instance, the device may capture the spoken phrase via one or more microphones and relay the captured audio to the first party cloud-based resources. The first party cloud-based resource may analyze the captured audio and identify the request to access the car rental service. The first party cloud-based resource may select or identify an appropriate third party cloud-based resource and cause the third party cloud-based resource to process the user request.

In some cases, once the request has been processed and, for example, payment information has been received from the user, the instance or session associated with the third party cloud-based resource may close. However, the third party cloud-based resource may still desire to send announcements to the user via the end user device. For instance, in the current example, the car rental service may want to notify the user when the car is ready for pickup.

However, simply allowing the third party cloud-based resources to cause the end user device to output audio announcements to the user at any time may be very disruptive. For instance, in the present example, the announcements may be received by the first party cloud-based resource as a data representative of a text-based announcement or message. The data may be converted into an audio format, such that the announcement may be output as sound by the end user device. Therefore, unlike devices that send visual notifications at the top or in the corner of a display, the audio announcements may interrupt other actives being carried out by the user. For example, the user and the user's family may be enjoying a meal, watching television, relaxing or spending family time together, sleeping etc. Therefore, implementations described herein for limiting the number, frequency, and window of time that a third party cloud-based resource may cause the device to output an audio announcement to the user.

For example, in some implementations, one or more first party cloud-based resources may be configured to receive the announcement or data representative of the announcement that a third party cloud-based resource is attempting to deliver to a user. The first party cloud-based resource may then determine if the announcement should be delivered to the end user device for output as sound into the home. In some cases, the first party cloud-based resources may determine that the announcement should be delivered based on a period of time that has elapsed since the user last accessed the third party cloud-based resource, a number of audio announcements the third party cloud-based resource has sent for delivery to the user since the last time the user accessed the third party cloud-based resource, a priority or setting associated with the third party cloud-based resource, a time of day, one or more settings on the device, one or more user account settings, or a combination thereof.

In some implementations, one or more of the first party cloud-based resources may be configured to send a token to the third party cloud-based resource upon the user closing the third party cloud-based resource. In some cases, the third party cloud-based resource may be allowed to send an audio announcement to the device upon the delivery of a valid token to the first party cloud-based resources. In some cases, the tokens may expire. For example, the token may be valid for a limited period of time, a limited number of uses, or a combination thereof. For example, the token may be valid for 24 hours following the user request to close the third party cloud-based resource.

In some cases, the token may be embedded with authentication information retrieval via a hashtag lookup or other security protocol. For instance, in some specific cases, the device may be configured to decode the token and retrieve the authentication information to validate the token itself without the need for the first party cloud-based resource to interfere. In other cases, the first party cloud-based resources may authenticate the token before sending the audio announcement to the device for reproduction as sound.

In some particular implementations, the first party cloud-based resources may store information related to the token that may be utilized to authenticate the token and/or to verify that the third party cloud-based resource is authorized to issue audio announcements to the user. For example, the first party cloud-based resource may store a time stamp associated with the token, an identifier associated with the token, a number of uses associated with the token, etc. For instance, in one example, the first party cloud-based resource may store a time stamp associated with a time when the token was issued and/or a time stamp associated with a time when the token expires. In other instances, the first party cloud-based resource may store an identifier associated with the token, an identifier associated with the third party cloud-based resource that the token was issued, and/or an identify associated with the user, the user's account, or the user device corresponding to the token. In some particular instances, the first party cloud-based resource may store a maximum number of available uses for the token, as well as a counter indicating the number of uses of the token.

Thus, in some implementations, the first party cloud-based resources may store sufficient information or data to authenticate the third party cloud-based resource as authorized to send audio announcements to the user, without relying on data sent as part of the token or from the third party cloud-based resource. In this way, the first party cloud-based resource may mitigate the risk of a third party cloud-based resource counterfeiting tokens.

Figure 1:
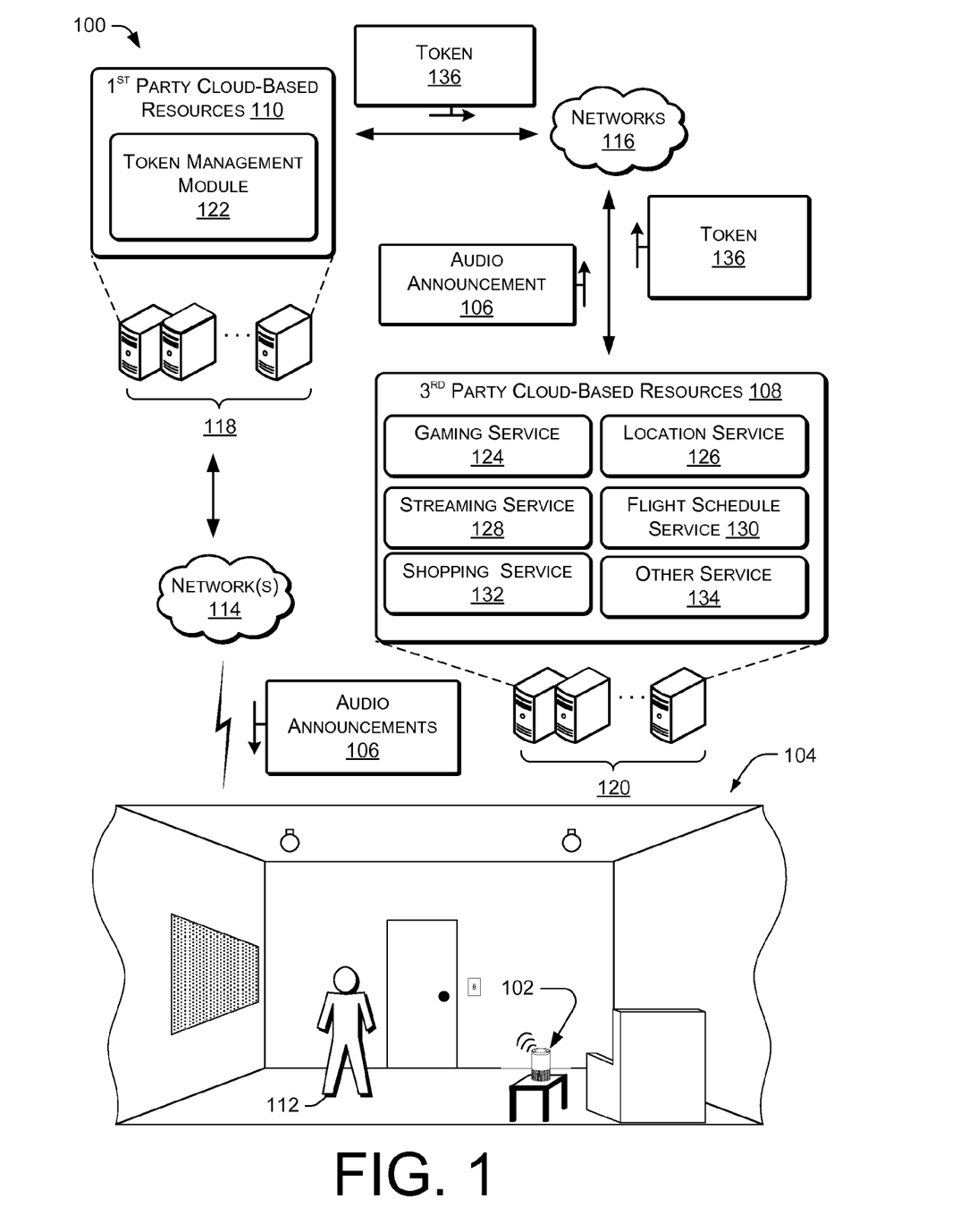
FIG. 1 illustrates an example home environment including a device physically situated in the home and configured to output audio announcements sent by third party cloud-based resources.

FIG. 1 illustrates an example home environment 100 including a device 102 physically situated in the home 104 and configured to output audio announcements 106 sent by third party cloud-based resources 108. In some cases, the audio announcements 106 may be a message, content, or other type of information that the third party cloud-based resource 108 desires to send to the device 102. In some cases, the audio announcement 106 may be sent by the third party cloud-base resource 108 to a first party cloud-based resource 110, as data representative of the audio announcement 106. In one particular example, the data may be sent by the third party cloud-based resource 108 in a text based format.

In the illustrated implementation, the device 102 is positioned on a table within the home 104. In other implementations, it may be placed in any number of places (e.g., an office, store, public place, etc.) or locations (e.g., ceiling, wall, in a lamp, beneath a table, under a chair, etc.). Further, more than one device 102 may be positioned in a single room, or one device 102 may be used to accommodate user interactions from more than one room of the home. In one particular example, the device 102 may be configured to communicate with other home electronic devices to capture environmental noise and perform user requested actions.

In the illustrated example, the device 102 may be configured to conduct transactions with first party cloud-based resources 110 and/or the third party cloud-based resources 108 and to output audio or other content to a user 112 located in the home 104. In one particular implementation, the device 102 may be configured as a voice controlled assistant that is primarily an audio-based device, receiving verbal instructions from the user 112 and outputting audio responses thereto. Thus, the device 102 may be equipped with one or more microphones and speakers, and has computing resources to process audio inputs. One particular implementation is described below in more detail with reference to FIG. 3.

In the illustrated example, the device 102 is shown as communicatively coupled to the third party cloud-based resources 108 via a network 114, first party cloud-based resources 110, and a network 116. In some cases, the device 102 may be communicatively coupled to the network 114 via wired technologies (e.g., wires, USB, fiber optic cable, etc.), wireless technologies (e.g., RF, cellular, satellite, Bluetooth, etc.), or other connection technologies. The networks 114 and 116 are representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies. The networks 114 and 116 carry data, such as audio data, between the device 102, the first party cloud-based resources 110, and/or the third party cloud-based resources 108. In some cases, the networks 114 and 116 may be the same network.

In some implementations, the device 102 may be configured to access services or application hosted by the first party cloud-based resources 110 and the third party cloud-based resources 108 to, for example, perform database searches, locate and consume/stream other forms of entertainment (e.g., games, movies electronic books, etc.), aid in personal management tasks (e.g., calendaring events, taking notes, etc.), assisting in online shopping, conducting financial transactions, and so forth. In some instances, the device 102 is implemented without a haptic input component (e.g., keyboard, keypad, touch screen, joystick, control buttons, etc.) or a display. In other instances, a limited set of one or more haptic input components may be employed (e.g., a dedicated button to initiate a configuration, power on/off, etc.).

The first party cloud-based resources 110 generally refer to a network accessible platform implemented as a computing infrastructure of processors, storage, software, data access, and so forth that is maintained and accessible via a network such as the Internet. The first party cloud-based resources 106 may not require end-user knowledge of the physical location and configuration of the system that delivers the services. Common expressions associated with cloud services include "on-demand computing," "software as a service (SaaS)," "platform computing," "network accessible platform" and so forth. In some cases, the first party cloud-based resources 110 may be implemented on one or more servers 118 remote to the home 104 and arranged in any number of ways, such as server farms, stacks, and the like that are commonly used in data centers.

The third party cloud based recourses 108 may also generally refer to network accessible platforms or services implemented as a computing infrastructure of processors, storage, software, data access, and so forth that may not require end-user knowledge of the physical location and configuration of the system that delivers the services. In general, the third patty cloud based recourses 108 represent various third party services and applications available to the user 112 located in the home 104 in addition to the applications and services sent by the first party cloud-based resources 110. In some cases, the third party cloud-based resources 108 may also be implemented on one or more servers 120 remote to the home 104 and arranged in any number of ways, such as server farms, stacks, and the like that are commonly used in data centers.

In some cases, the servers 118 may implement or host a token management module 122 for facilitating delivery of the audio announcements 106 from one or more third party cloud-based resources 108 to the user 112 via the device 102. In some implementations, the token management module 122 may be configured to authenticate and/or validate tokens 124 received from the third party cloud-based resources 108 to determine if a particular audio announcement 106 should be delivered to the device 102 for output to the user 112.

The third party cloud-based resources 108 may include any number of cloud-based services, applications, and/or resources implemented on the servers 118. For instance, in the illustrated example, the third party cloud-based resources 108 includes a gaming service 124, a location service 126, a shopping service 128, an event scheduling service 130, a streaming service 132, among other services 134. In some cases, the number and type of the third party cloud-based resources 108 available to the user 112 may be a subset of the total number or types of third party cloud-based resources 108 accessible by the first party cloud-based resources 110. It should be understood, that the services 124-138 are includes as a non-limiting list of services that may otherwise be available to the end user 112.

In some examples, the user 112 may issues a request to access a particular third party cloud-based resource 108, such as flight schedule service 130. For example, the user 112 may have to pick up a passenger (such as the user's 112 mother-in-law) traveling on a specific flight. In this example, the user 112 may access the flight schedule service 130 via the device 102 and receive information that the passenger is arriving on flight 134 from Detroit at 2:34 pm. The user 112 may close the flight schedule service 130, as the user 112 knows when to pick up the passenger. However, in some cases, the arrival time for flight 134 from Detroit may change. For instance, the flight 134 from Detroit may experience a technical issue and be delayed for 2 hours. In this instance, it may be important to the user 112 that the flight scheduling service 130 notify the user 112 that the flight 124 from Detroit is delayed, as the user 112 may avoid waiting at the airport for the passenger. Thus, in this instance, allowing the flight scheduling service 130 to deliver an audio announcement 106 to the device 102 related to the flight time change may be desirable.

However, allowing the third party cloud-based resources 108 to delivery audio announcements 106 without restriction may introduce announcements to the user 112, as well as consume processing and network resources that may be allocated to other interactions and therefore may be limited in some implementations described herein. Therefore, in some examples, the third party cloud-based resources 108 may be provided a window or token 136 upon particular types of interaction or upon the user 112 closing the particular resource that allows the third party cloud-based resource 108 to deliver the audio announcements 106 to the user 112 via the device 102 even when the third party cloud-based resource has been closed. For example, the window or token 136 may be limited in scope based on time (e.g., a period of time), number of uses, or a combination thereof.

For instance, in the example related to flight 134 from Detroit and the user 112 mother-in-law, the flight schedule service 130 may request or receive a token 136 from the token management module 122 of the first party cloud-based resources 110 upon delivery of the flight information to the user 112 or when the user 112 closed the flight schedule service. In this case, the token 136 may be limited to a time period associated with the arrival time or day of flight 134 from Detroit. For example, the user 112 may have accessed the flight information via the flight schedule service 130 at 10:36 am on the morning of the flight and therefore, the flight schedule service 130 may request a token 136 from the token management module 122 to allow the flight schedule service 130 to deliver audio announcements 106 for the next 12 hours or until 10:36 pm on the day of arrival.

Thus, in this example, if the flight time change occurred at 12:14 pm, the flight schedule service 130 may send both the token 136 and the audio announcement 106 related to the change of arrival time for flight 134 from Detroit to the token management module 122. The token management module 122 may validate or authenticate the token 136 and once validated or authenticated forward the audio announcement 106 to the device 102 for output as sound. In some cases, the audio announcement 106 or data representative of the audio announcement 106 may be converted by one or more of the first party cloud-based resources 110 into an audio format that may be output by the device 102 prior to the token management module 122 sending the audio announcements 106 or data to the device 102.

In some implementations, data associated with the token 136 may be stored at the first party cloud-based resources 110, such that the token management module 122 may validate or authenticate the token 136 without relying on data associated with the token 136 itself. For example, a token ID and an ID associated with the third party cloud-based resource 108 may be stored at the first party cloud-based resource 110. In some particular implementations, no actual token 136 may be exchanged between the third party cloud-based resource 108 and the token management module 122. Rather, the information associated with the token 136 may be generated by the token management module 122 and stored at the first party cloud-based resources 110. In this implementation, the third party cloud-based resource 108 may receive an indication that a token 136 was generated and that the third party cloud-based resource 108 may issue a threshold number of audio announcements 106 during a predetermined period of time. In other cases, the third party cloud-based resource 108 may be aware that a token 136 is generated each time the user 112 closes the third party cloud-based resource 108. The a threshold number of audio announcements 106 during a predetermined period of time may also be aware that the token 136 allows the a threshold number of audio announcements 106 during a predetermined period of time to issue a threshold number of audio announcements 106 for a predetermined period of time In the example, described above the timer period associated with the token 136 was based on the information sent to the user 112 by the third party cloud-based resource 108 (e.g., the flight time). However, in other examples, the time period associated with the token 136 received by the flight schedule service 130 for delivering the audio announcement 106 may be a predetermined period regardless of the third party cloud-based resource requesting or being granted the token 136. In some examples, the time period associated with a token 136 may be based on a type of resource being provide (e.g., shopping service 132 may be provided a smaller time period than the flight schedule service 130), the time of day (e.g., tokens 136 granted in the morning may last longer than tokens 136 granted at night), setting associated with the user 112 or the user's 112 account, the location of the device 102 within the home 104, etc.

In some cases, the token 136 may also be limited in uses or number of announcements 106 that the third party cloud-based resource 108 may cause the device 102 to output. For instance, in the flight time example above, the token 136 may be limited to a maximum of three audio announcements 106 or three uses, as it would be unlikely that the flight time would change more than three times within the twelve hour time period. In some cases, the number of uses associated with a particular token 136 may be fixed regardless of the third party cloud-based resource 108 receiving the token 136. In other cases, the number of uses associated with a token 136 may be based on a type of resource being provided, the time of day, setting associated with the user 112 or the user's 112 account, the location of the device 102 within the home 104, etc.

Figure 2:
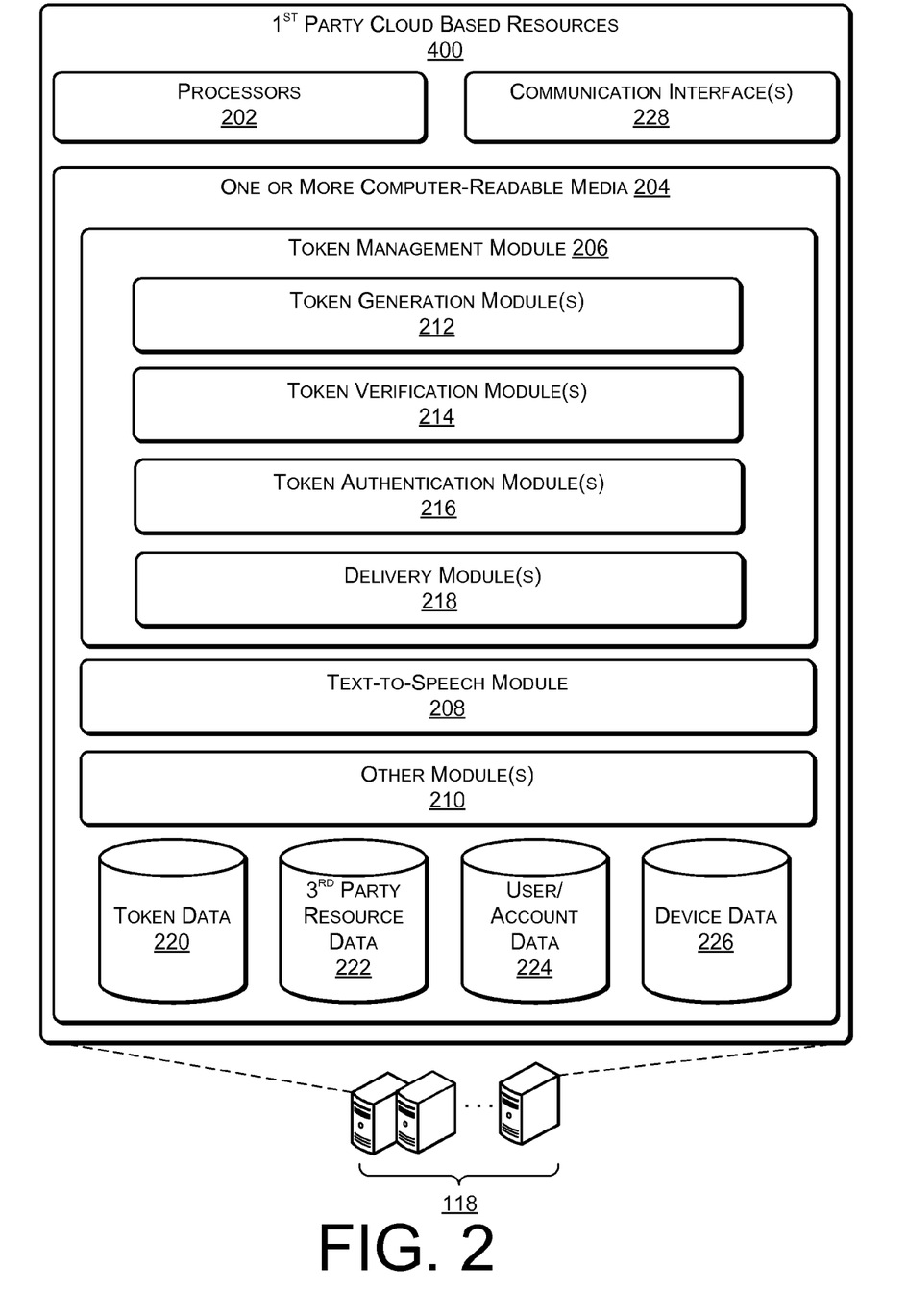
FIG. 2 illustrates an example architecture of one or more servers associated hosting the first party cloud-based resources.

FIG. 2 illustrates an example architecture of one or more servers 118 associated hosting the first party cloud-based resources 200. The first party cloud-based resources 200 collectively comprise processing resources, as represented by processors 202, and computer-readable storage media 204. The computer-readable storage media 204 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

Several modules such as instruction, data stores, and so forth may be stored within the computer-readable media 204 and configured to execute on the processors 202. For example, token management modules 206 are provided for granting and processing of tokens associated with delivery audio announcements from third party cloud-based resources to end user devices. Various other modules may also be stored on computer-readable storage media 204, such as format conversion module 208 for converting announcements in a texted based format into audio announcements in an audio based format that may be output to a user by an end user device, as well as other module 210 for sending various resources and/or functionally. In the current example, the format conversion module 208 is shown as part of the first party cloud-based resources 200 but it should be understood in other examples, the format conversion module 208 may be a protocol or resource called or accessed by the first party cloud-based resources 200.

In some implementations, the token management module 206 may include other modules for generating, verifying, authenticating and delivering audio announcements. For instance, the token management module 206 may include a token generation module 212 for generating tokens that may be sent to third party cloud-based resources and/or stored at the first party cloud-based resources 200. The token management module 206 may also include a token verification module 214 for determining if a token is valid (e.g., within the predetermined time period and/or number of uses), a token authentication module 216 for determining if the token is authorized (e.g., the third party cloud-based resource is the third party cloud-based resource that the token was issued to), and a delivery module 218 for determining which end user device to cause to output the audio announcement.

The computer-readable media 204 may also store token data 220, third party resource data 222, user data or account data 224, and/or device data 226. The token data 220 may include elapsed time associated with a token, a period of time associated with a token, a maximum number of uses associated with a token, the number of uses associated with a token, a token ID, a third party cloud-based resource ID, a user or account ID or number, or other types of information that may be utilized to verify or authenticate a token received from a third party cloud-based resource.

The third party resource data 222 may include information known about each of third party cloud-based resources available to users of the system described with respect to FIG. 1. For example, the third party resource data 222 may include information related to the usability (e.g., function or specification) or available (e.g., license required, price, etc.). In some cases, the third party resource data 222 may include information related to a type of token that may be generated or one or more conditions (e.g., specific time periods or number of uses) that may be applied to tokens associated with particular third party cloud-based resources.

The user or account data 224 may include information known about an account associated with the device. For example, the user or account data 224 may including information known about one or more user's associated with the account, such as profile information, demographic information, user based restrictions, accessible first party and third party cloud-based resources, historical usage or historical data related to user (e.g., shopping history, consumption history, etc.), among others. The user or account data 224 may include information known about a home, office, or other physical location associated with the account. For instance, the user or account data 224 may include information related to a number and physical location of each device of a system or a physical relationship (e.g., distance) between particular devices of a system.

The device data 226 may include information known about particular devices associated with a user, an account, or a physical location. For example, the device data 226 may include capabilities and/or specification information associated with individual devices (e.g., display available, audio only, processing capabilities, device restrictions, etc.) associated with a device. In other examples, the device data 226 may include location information related to the relative position of particular devices within a home or office and/or usage information related to particular devices (e.g., time of day, type of service, users, etc.).

The first party cloud-based resources 200 may also include one or more communication interfaces 228 to facilitate communication between the third party cloud-based resources and the end user devices. The communication interfaces 228 may support communication via various networks, such as cellular networks, radio, WiFi networks, the Internet, and so forth. In some cases, the communication interface 228 may support multiple communication protocols for connecting with various different types of networks and/or devices.

In some examples, a user may issue a request to access a particular third party cloud-based resource, such as pizza order service. For example, the user order a pizza for an in store pick up. Thus, in a particular example, the user may access the pizza order service. The user may close the pizza order service. The token management module 206 may receive information that the user closed the pizza order service and generate a token or the token generation module 206 may receive a request from the pizza order service for a token that the pizza order service may utilize to send an audio announcement to the user. For instance, the pizza order service may be configured to send an audio announcement to the user when the pizza is ready to pick up.

In this example, the token generation module 212 may generate a specific token for the pizza order service to allow the pizza order service to issue an audio announcement when the pizza is ready to pick up. In this example, the token may be specific to the user, the device the user order the pizza, and to the pizza order service. Thus, only the pizza order service may utilize the token and only to provide an audio announcement to the user via the device the order was placed with. In other cases, the token generation module 212 may utilize the user or account data 224 and/or the device data 226 to generate a token that is specific to a user account and/or associated with multiple devices associated with the account. For instance, the token may allow the pizza order service to issue an audio announcement that is broadcast by each device located in the user's home, to better ensure the user receives the audio announcement.

In this example, the token generated by the token generation module 212 may be limited to a two hour period of time based on third party resource data 222 known about the pizza order service. For instance, the token generation module 212 may be aware that the pizza order service typically sends audio announcements related to pick up times within one hour of the user placing an order. Thus, the token generation module 212 may limit any token received by the pizza order service to a time period slightly longer than the typical audio announcement delivery time (e.g., in this case double or two hours). In this example, the token may also be limited to a single use as the third party resource data 222 indicates that the pizza order service only sends a single audio announcement following each order. In other cases, the token may be valid for up to two or three uses as the third party resource data 222 indicates that the pizza order service typically sends a first audio announcement when the pizza is ready and a second audio announcement 30 minutes later if the pizza was not picked up. In other examples, the period of time or number of uses may vary based on the third party resource data 222, user or account data 224, and/or the device data 226.

Once the pizza is ready to pick up, the pizza order service may send the audio announcement and the token back to the first party cloud-based resources 200. In this instance, the token verification module 214 may determine based in part on the data associated with the token or received from the third party cloud-based resource and/or in part on the token data 220 stored on the first party cloud-based resources 200 that the token is valid. For example, the token verification module 214 may determine the token has uses remaining and/or has not expired.

If the token is valid, the token authentication module 216 may determine that the third party cloud-based resource providing the token is the authorized user of the token. For instance, the token authentication module 216 may identify that the pizza order service is the resource associated with the token. The token authentication module 216 may also confirm that the user or the device the audio announcement is intended for is the user and/or device associated with the token. In this manner, the token authentication module 216 may be able to ensure that the audio announcements are delivered to the correct user and/or device.

Once the token is authenticated, the delivery module 218 may select a device associated with the user, the user's account, or the user's home for delivering the audio announcement too. For example, the delivery module 218 may cause the device the user accessed the pizza order service from to output the audio announcement. In other cases, the delivery module 218 may receive information from one or more other modules of the first party cloud-based resources 200 indicating a location of the user within the home environment and cause a device near the location to output the audio announcement. In some cases, the audio announcement may be textual based and the format conversion module 208 may convert into a format that may be output as audio to the end user by a device.

Figure 3:
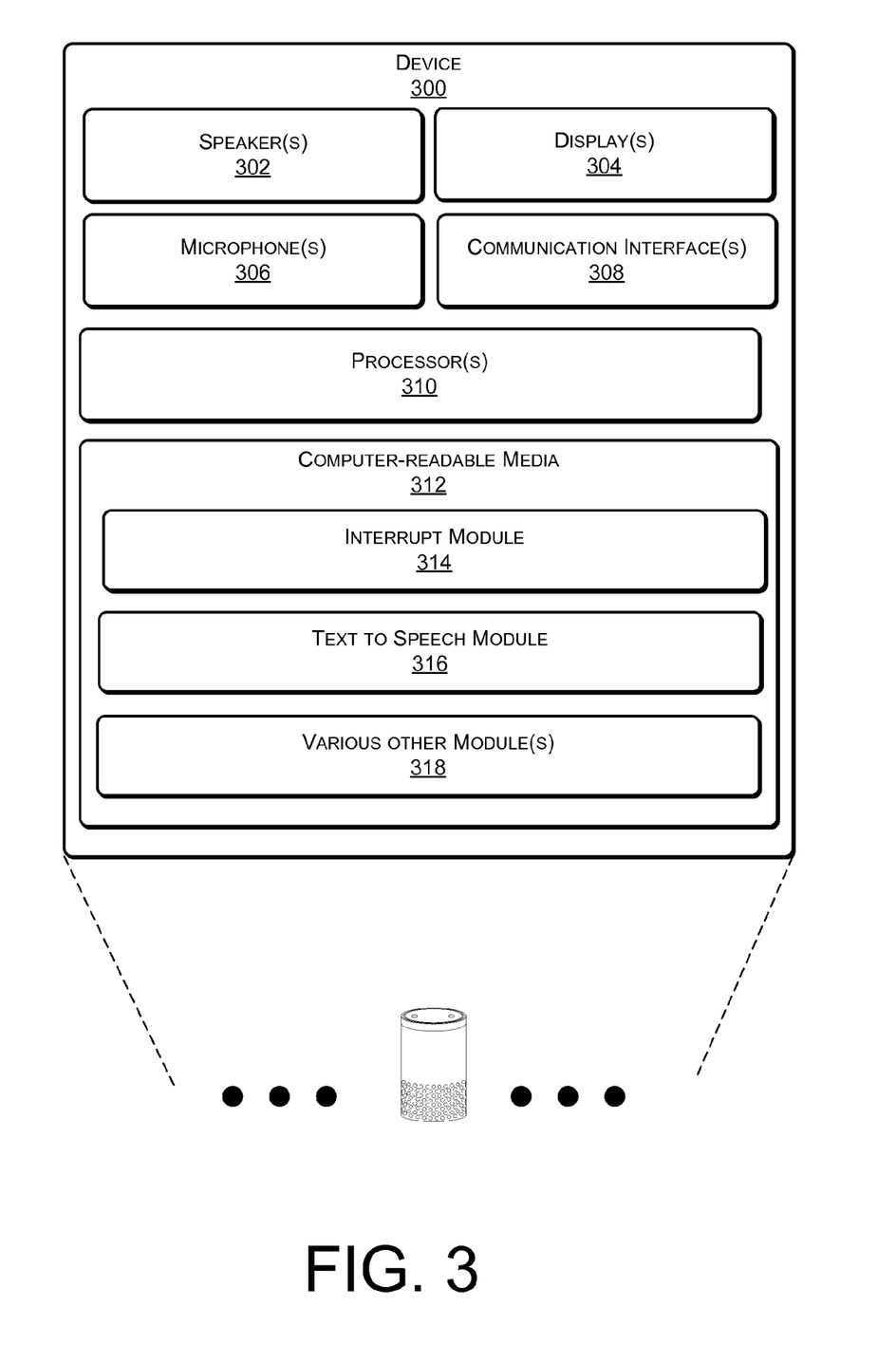
FIG. 3 illustrates an example architecture of a computing device, such as the computing devices in the environment of FIG. 1.

FIG. 3 illustrates an example architecture of a computing device, such as the computing devices in the environment of FIG. 1. Generally, the computing device 300 may be implemented as a standalone device that is relatively simple in terms of functional capabilities with limited input/output components, memory and processing capabilities or as part of a larger electronic system.

The computing device 300 may include one or more speakers 302 and one or more displays 304 to reproduce electronic items for consumption by a user. The computing device 300 may also include one or more microphones 306 to capture sound from an environment and convert the sound into one or more audio signals. The microphones 306 may be a microphone array, a calibrated group of microphones, or multiple microphone arrays or calibrated groups. In some examples, microphones 306 may be incorporated with an analog-to-digital converter to convert the sound into digital microphone output signals for processing.

The computing device 300 also includes one or more communication interfaces 308 to facilitate communication between one or more networks (such as network 110 or 112 of FIG. 1), first party cloud-based resources, and/or third party cloud-based resources. The communication interfaces 308 may also facilitate communication between one or more wireless access points, a master device and/or one or more other computing devices as part of an ad-hoc or home network system. The communication interfaces 308 may support both wired and wireless connection to various networks, such as cellular networks, radio, WiFi networks, short-range or near-field networks (e.g., Bluetooth®), infra-red signals, local area networks, wide area networks, the Internet, and so forth.

The computing device 300 includes, or accesses, components such as at least one control logic circuit, central processing unit, one or more processors 310, in addition to one or more computer-readable media 312 to perform the function of the computing device 300 and or store items. Additionally, each of the processors 310 may itself comprise one or more processors or processing cores.

Depending on the configuration of the computing device 300, the computer-readable media 312 may be an example of tangible non-transitory computer storage media and may include volatile and nonvolatile memory and/or removable and non-removable media implemented in any type of technology for storage of information such as computer-readable instructions or modules, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processors 310.

Several modules such as instruction, data stores, and so forth may be stored within the computer-readable media 312 and configured to execute on the processors 310. For example, the computer-readable media 312 may store an interrupt module 314, a text-to-speech module 316, and/or various other modules 318 (e.g., speech-to-text modules, operating modules, etc.).

The interrupt module 314 may be configured interrupt a current action, activity, or process being performed by the device 300 in order to deliver an audio announcement from one or more cloud-based resources. For instance, a user may be streaming audio or listing to an audio book via the device 300 when the audio announcement is received at the communication interfaces 308. The interrupt module 314 may cause the streaming audio or audio book to pause, mute, or reduce in volume while outputting the audio announcement to output via the microphones 306.

The text-to-speech module 316 may be configured convert textual and/or visual based audio announcements received from the first party cloud-based resources or the third party cloud-based resources to speech which may be output by the speakers 302. For instance, the device 300 may not be equipped with the displays 304 and one or more of the first party or third party cloud-based resources may be configured to send data to traditional display based devices. In this instance, the device 300 may receive the textual based audio announcement and covert the text into sound that may be output to a user.

For example, the device 300 may receive audio announcements from either first party or third party cloud-based resources and output the audio announcements to the user via the speakers 302. The device 300 may utilize the microphones 306 to capture the user spoken response. In some instances, the device 300 may be configured to detect when a user is speaking and to capture audio during that time. In other instances, the device 300 may be configured to capture audio for a predetermined time period following the output of an audio announcement and/or to continuously capture audio from the surrounding environment.

The device 300 may then transmit the captured audio to the first party cloud-based resources via one or more of the compunction interfaces 308. In some particular implementations, the device 300 may be configured to convert the captured audio into textual content or transcript and to send the textual content to the first party cloud-based resources. The process of receiving audio announcements and capturing user response may be repeated for multiple interactions or messages between the cloud-based resource and the user. In some cases, each time the audio announcement is received the device 300 may pause, mute, or reduce the volume associated with other operations being performed by the device 300 and/or by other devices in the environment and in communication with the device 300.

FIGS. 4-7 are flow diagrams illustrating example processes for implementing audio announcement from third party cloud-based resources within the system described herein. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, which when executed by one or more processors, perform the recited operations. Generally, computer-executable instructions include routines, programs, objects, components, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

Figure 4:
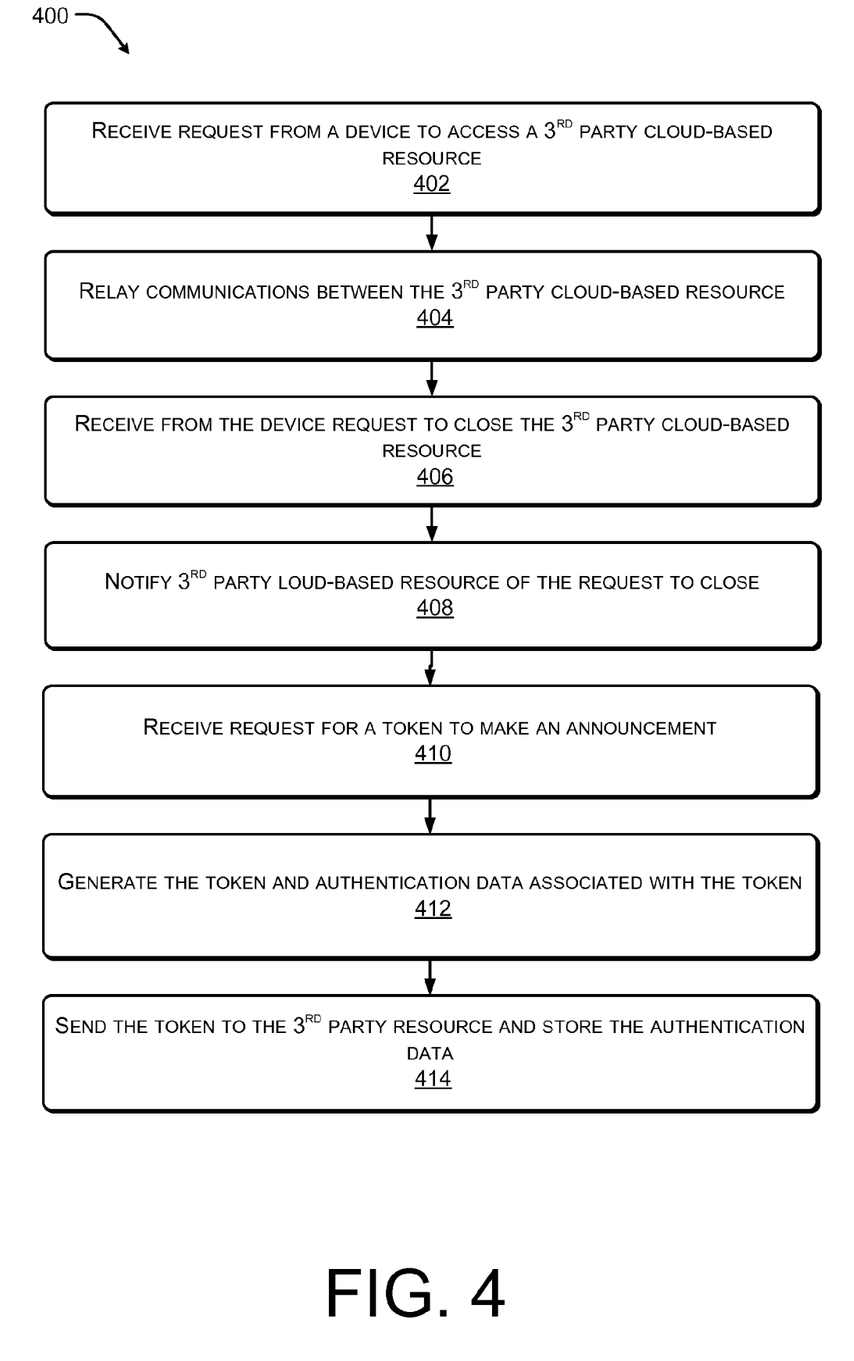
FIG. 4 is an example flow diagram showing an illustrative process to facilitate third party cloud-based resources.

FIG. 4 is an example flow diagram showing an illustrative process to facilitate audio announcements third party cloud-based resources. For example, a system as illustrated in FIG. 1 may include one or more devices located in a physical environment, such as a home or office, configured to interact with one or more users via audio announcements and user spoken commands or requests. In some cases, the devices may be in communication with first party cloud-based resources. In some examples, the first party cloud-based resources include a third token management module for sending tokens to permit third party cloud-based resources to issues or cause the devices to output audio announcements at a time after the user has closed a particular third party cloud-based resource.

At 402, the first party cloud-based resource receives a request from a device to access a third party cloud-based resource. The request indicating which third party cloud-based resource the user desires to interact with. For example, the user may be attempting to access a third party shopping resource or a car rental resource, as described above.

At 404, the first party cloud-based resource receives relays communications of a communication channel between the third party cloud-based resource and the user device while the user is interaction with the third party cloud-based resource. For example, the user may conduct a transaction with a third party shopping resource which may require several interaction between the user and the third party cloud-based service. In this example, the communication channel may be made up of several sessions, each of which may consist of a single interaction between the third party cloud-based resource and the user device.

At 406, the first party cloud-based resource receives from the device to close or otherwise restrict the third party cloud-based resource. For instance, in the example of FIG. 1, the user may close the flight scheduling service upon receiving information associated with the arrival time of a specific flight. In some cases, the first party cloud-based resource may receive the request to close the third party cloud-based resource from the device, the process 400 may proceed to 408 and the first party cloud-based resource may notify the third party cloud-based resource of the request to close. In some cases, a token management module, such as token management module 206 of FIG. 2, may generate a token for the third party cloud-based resource based in part on the user request to close the third party cloud-based resource.

At 410, the first party cloud-based resource may receive a request for a token from the third party cloud-based resource that the user closed. For example, the third party cloud-based resource may still be pricing a user request for information that should be sent to the user, such as the pizza example of FIG. 2, or the third party cloud-based resource may be aware of a situation in which the information previously sent to the user may change, such as the flight time example of FIG. 1. In both examples, the third party cloud-based resource may request a token to deliver audio announcements for a particular purpose or during a particular period of time. In other examples, the third party cloud-based resource may not need to explicitly request a token as the token may be issued as a matter of course when a resource is closed.

At 412, the first party cloud-based resource generates the requested token and/or authentication data associated with the token. In some cases, the token may be generated based data associated with the user, data associated with a user account, data known about the third party cloud-based resource, data associated with the device, and/or data associated with the closed communication session. For example, the time period in which the token is valid may be based in part on the type of third party cloud-based service requesting the token and/or on the type of interaction between the requesting third party cloud-based service and the user. In another example, the maximum or threshold number of audio announcements that may be output under the token may be based in part on the type of third party cloud-based service requesting the token and/or on the type of interaction between the requesting third party cloud-based service and the User.

In some implementations, when the first party cloud-based resource generates the token, the token may be assigned to a particular user, a particular user account, an environment, and/or one or more end user devices associated with a user, user account, or environment. For example, the token may restrict the audio announcements to the device the user was conducting the communication with the third party cloud-based resource on. In another example, the audio announcements may be limited to a device located in the user's living room or to devices outside of the user's bedroom.

At 414, the first party cloud-based resource sends the token to the requesting third party cloud-based resource and stores the authentication data. For example, the token may be sent to the requesting third party cloud-based resource, however the information used to authenticate the token may be generated and stored on the first party cloud-based resource to reduce the likelihood of a third party producing an unauthorized token. In some cases, the token and the authentication data may be stored on the first party cloud-based resource, thereby eliminating the need to transfer the token back and forth between the first party cloud-based resources and the third party cloud-based resources.

Figure 5:
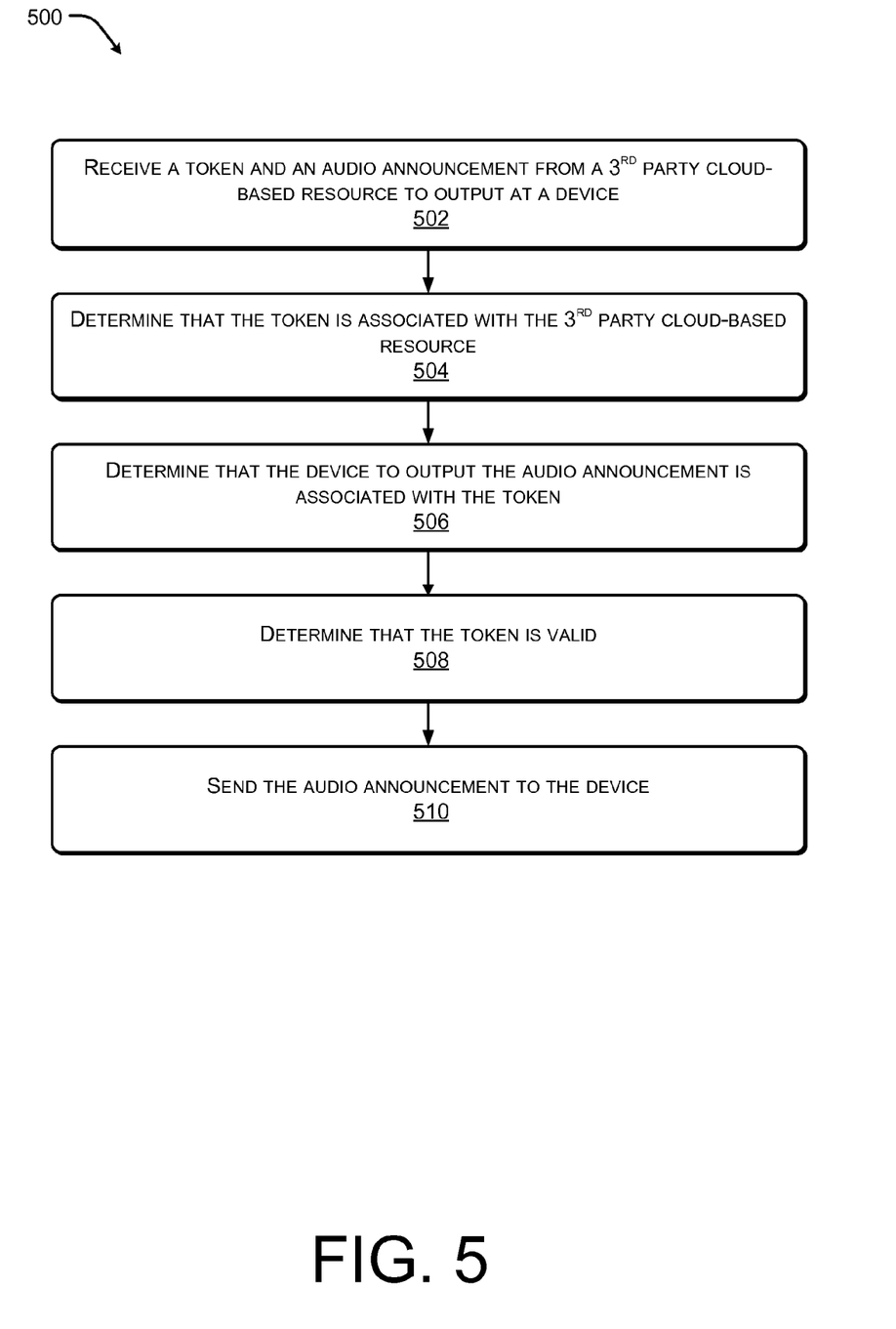
FIG. 5 is another example flow diagram showing an illustrative process to facilitate third party cloud-based resources.

FIG. 5 is another example flow diagram showing an illustrative process 500 to facilitate audio announcements with a third party cloud-based resource. For example, a system as illustrated in FIG. 1 may include one or more devices located in a physical environment, such as a home or office, configured to interact with one or more users via audio announcements and user spoken commands or requests. In some cases, the devices may be in communication with at least one first party cloud-based resource. In some examples, the first party cloud-based resource may be a third token management module for authenticating and validating tokens received from the third party cloud-based resource before permitting the third party cloud-based resource to issues or cause the devices to output audio announcements.

At 502, the token management module (or other first party cloud-based resource) receives a token and an audio announcement or data representative of the audio announcement from a third party cloud-based resource. For instance, in the example of FIG. 1, the flight schedule service may have requested a token after delivering the flight information related to flight 134 from Detroit and the token management module may have sent a token usable by the flight schedule service during a twelve hour period to allow the flight schedule service to send audio announcements related to changes in the flight information. For instance, if there was a delay in departure of flight 134 from Detroit, the flight schedule service may send the token and an audio announcement, such as "Arrival time for flight 134 from Detroit changed from 2:34 pm to 4:34 pm".

At 504, the token management module determines that the token is associated with the third party cloud-based resource. In other words, the token management module may determine that the third party cloud-based resource is authorized to use the token provided. For example, the token management module may decode data associated with the token to identify a token identifier and compare the token identifier to data stored at the first party cloud-based resource to determine if the authorized user includes the third party cloud-based resource. In other examples, the token management module may access token data stored on the first party cloud-based resource to determine if the third party cloud-based resource was granted a token. In these examples, the token management module may authenticate the token without relying on any data sent by the third party cloud-based resource.

At 506, the token management module determines if the device the third party cloud-based resource that desires to output the audio announcement is associated with the token. For instance, the token may be tied to a particular user, a particular account, a particular environment, and/or one or more particular end user devices. For example, the token may permit the third party cloud-based resource to only output the audio announcement on the device the user used to access the third party cloud-based resource. In another example, the token may permit the third party cloud-based resource to output the audio announcement on any device associated with the user that accessed the third party cloud-based resource. In other examples, the token may permit the third party cloud-based resource to output the audio announcement on select devices of an environment, such as a home, associated with the user or the user's account.

In some cases, the user may select one or more option to restrict or direct the devices upon which tokens may be granted and/or audio announcements may be output. For example, the user may select times of day that the audio announcements may be and may not be output. For instances, the user may prevent the output of audio announcements between 8 pm and 6 am or while the user is sleeping. In other examples, the user may select devices which audio announcements may be output from, such as the devices in the common areas (e.g., the kitchen and living room) but not on devices in private areas (e.g., bedrooms).

At 508 the token management module determines if the token is valid (e.g., that the token has not expired). For example, the token management module may access data stored on the first party cloud-based resources associated with the token and determine the time period related to the token has expired or that the token has reached the limited number of uses. In other examples, the token may be self-validating to reduce the amount of data stored on the first party cloud-based resource.

At 510, the token management module sends the audio announcement to the device if the third party cloud-based resource is authorized, the device is authorized, and the token is valid. In some case, the token management module or another of the first party cloud-based resources may convert the audio announcement or data representative of the audio announcement from a text based form into an audio based form that may be output by the device. For example, the data received may be textual or visual in nature and once converted the data may represent of an audio signal. In some implementations, the token management module may also disable the token if the token was has reached the maximum number of uses.

Figure 6:
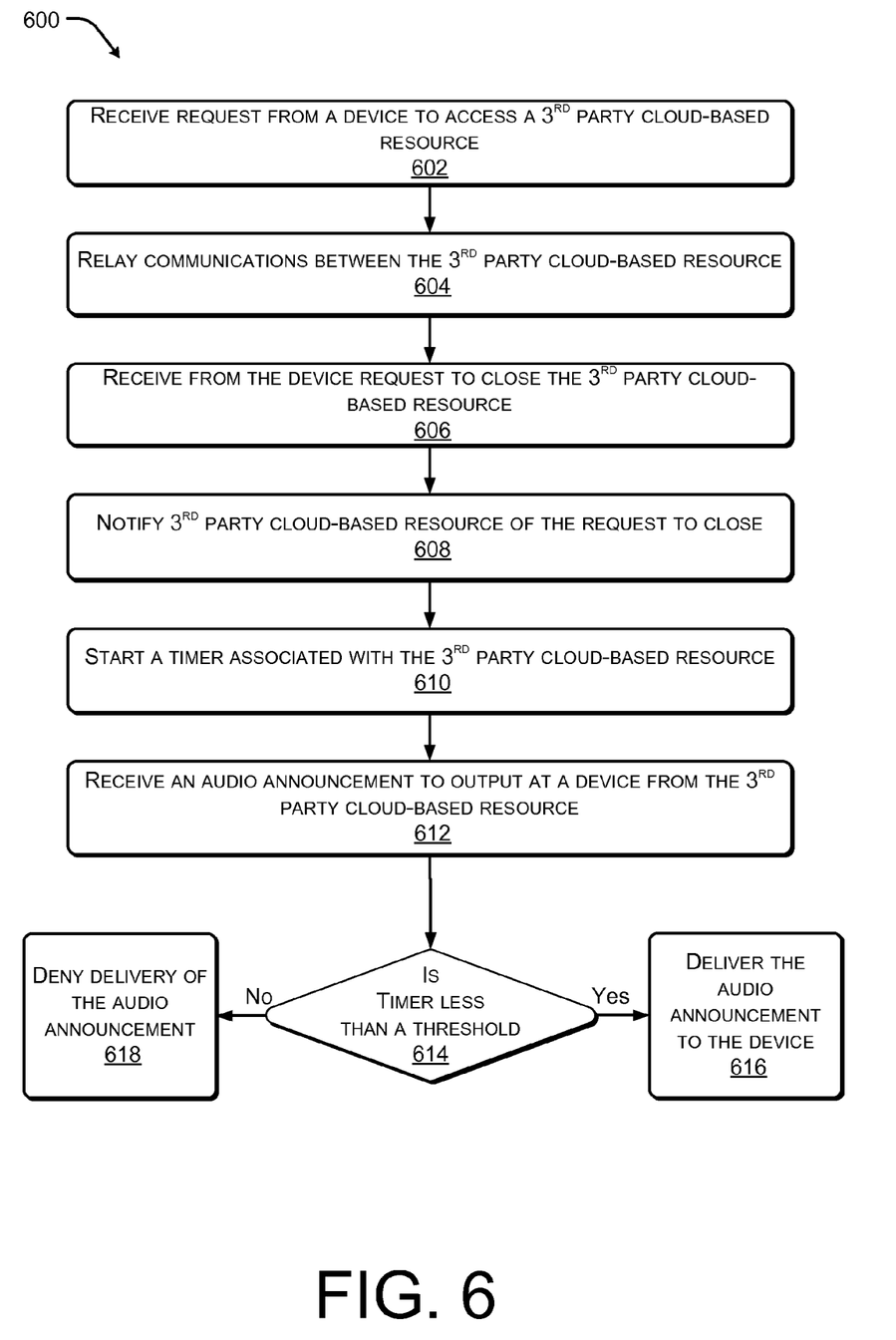
FIG. 6 is another example flow diagram showing an illustrative process to facilitate third party cloud-based resources.

FIG. 6 is another example flow diagram showing an illustrative process to facilitate interactions with a third party cloud-based resource. For example, a system as illustrated in FIG. 1 may include one or more devices located in a physical environment, such as a home or office, configured to interact with one or more users via audio announcements and user spoken commands or requests. In some cases, the devices may be in communication with at least one first party cloud-based resource. In some examples, the first party cloud-based resource may include a third token management module for sending tokens to permit third party cloud-based resources to issues or cause the devices to output audio announcements at a time after the user has closed the third party cloud-based resource.

At 602, the first party cloud-based resource receives a request from a device to access a third party cloud-based resource. The request indicating the third party cloud-based resource the user desires to interact with. For example, the user may be attempting to access a third party shopping resource or a car rental resource, as described above.

At 604, the first party cloud-based resource receives relays communications between the third party cloud-based resource and the user device while the user is interaction with the third party cloud-based resource. For example, the user may conduct a transaction with a third party shopping resource which may require several interactions between the user and the third party cloud-based service.

At 606, the first party cloud-based resource receives from the device to close the third party cloud-based resource. For instance, in the example of FIG. 1, the user may close the flight scheduling service upon receiving information associated with the arrival time of a specific flight. In some cases, the first party cloud-based resource may receive the request to close the third party cloud-based resource from the device, the process 600 may proceed to 608 and the first party cloud-based resource may notify the third party cloud-based resource of the request to close. In some cases, a token management module, such as token management module 206 of FIG. 2 may be notified of the user request to close the third party cloud-based resource as well.

At 610, the first party cloud-based resources start a timer associated with the third party cloud-based resource. For instance, rather than issuing a token to the third party cloud-based resource, the first party cloud-based resource may maintain the authorization for the third party cloud-based resource to issue audio announcements internally, such as by maintaining a timer associated with each third party cloud-based resource accessed and/or closed by a user. In some cases, the timer may be used to track the amount of time that has elapsed since the user closed the third party cloud-based resource.

At 612, the first party cloud-based resource receives an audio announcement or data representative of the audio announcement from the third party cloud-based resource. For instance, in the example of FIG. 1, if there was a delay in departure of flight 134 from Detroit, the flight schedule service may send an audio announcement, such as "Arrival time for flight 134 from Detroit changed from 2:34 pm to 4:34 pm". In some cases, the data may be in a textual or visual format and the data may be converted from data in a text to data representative of an audio signal.

At 614, the first party cloud-based resource determines if the timer is less than a threshold. For example, the first party cloud-based resource may compare or test a value to ensure the value is within an acceptable range. In another example, the first party cloud-based resource may be configured to allow the third party cloud-based resource to send audio announcement within four hours of the user closing the third party cloud-based resource. Thus, in this example, if the timer is less than four hours the process 600 proceeds to 616 and the first party cloud-based resource delivers the audio announcements to the device. Otherwise, the process 600 proceeds to 618 and the first party cloud-based resources deny the delivery of the audio announcements.

In some cases, the threshold may be based on the type of resource and/or the type of information sent to the user by the resource. For example, the threshold time allocated to the pizza order service of FIG. 2 may be relatively short compared to the threshold time allocated to the flight schedule service of FIG. 1. In other cases, the threshold may be based on one or more user settings, account settings, a status of the third party cloud-based resource (e.g., trusted third party), a time of day the third party cloud-based resource was closed, a location of the user within the environment, a status of the device (e.g., on/off, in use, sleep, etc.), among others.

Figure 7:
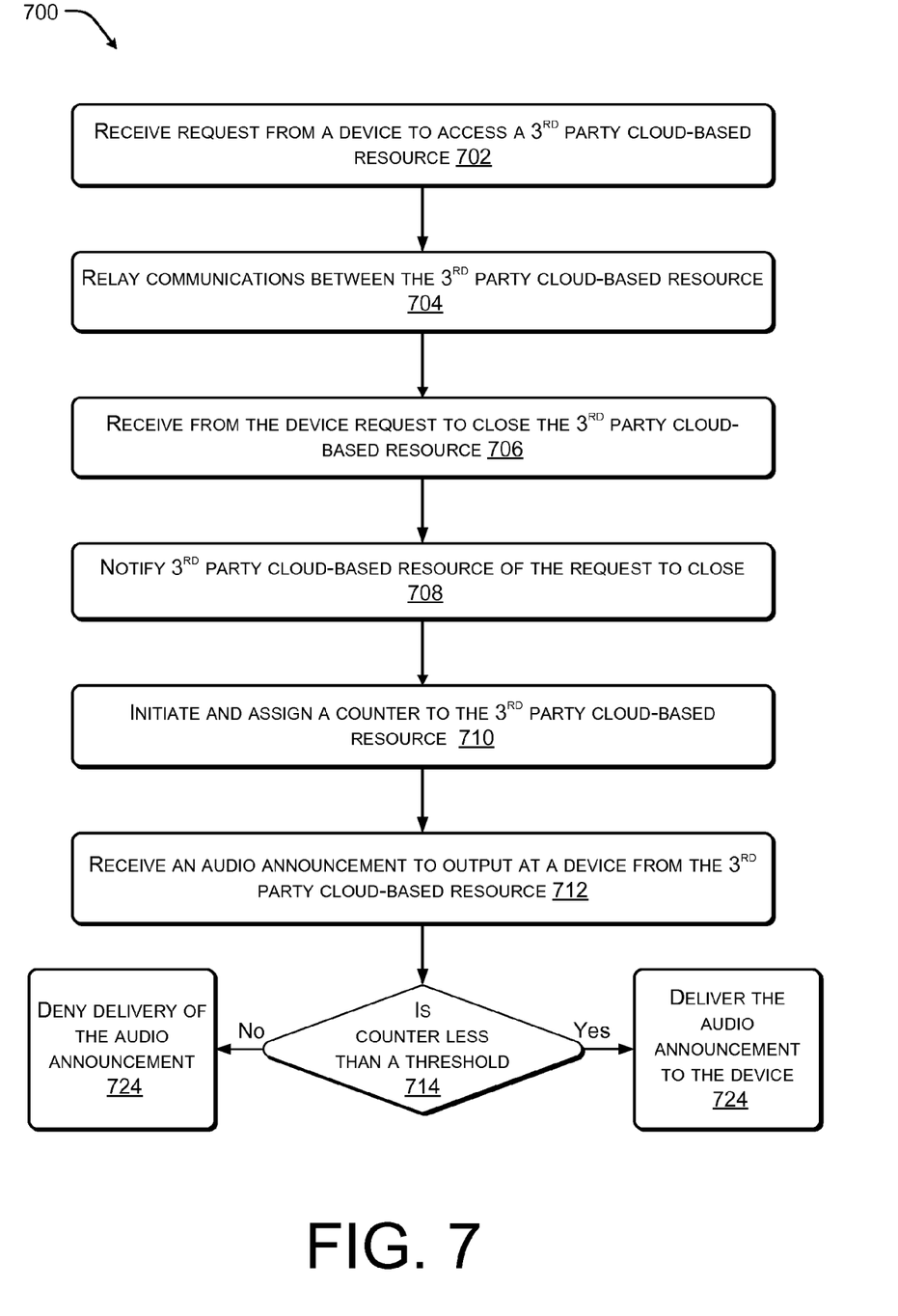
FIG. 7 is another example flow diagram showing an illustrative process to facilitate third party cloud-based resources.

FIG. 7 is another example flow diagram showing an illustrative process to facilitate interactions with a third party cloud-based resource. For example, a system as illustrated in FIG. 1 may include one or more devices located in a physical environment, such as a home or office, configured to interact with one or more users via audio announcements and user spoken commands or requests. In some cases, the devices may be in communication with a first party cloud-based resource. In some examples, the first party cloud-based resource includes a third token management module for sending tokens to permit a third party cloud-based resource to issues or cause the devices to output audio announcements at a time after the user has closed the third party cloud-based resource.

At 702, the first party cloud-based resource receives a request from a device to access a third party cloud-based resource. The request indicating a third party cloud-based resource that the user desires to interact with. For example, the user may be attempting to access a third party shopping resource or a car rental resource, as described above.

At 704, the first party cloud-based resource receives relays communications between the third party cloud-based resource and the user device while the user is interaction with the third party cloud-based resource. For example, the user may conduct a transaction with a third party shopping resource which may require several interaction between the user and the third party cloud-based service.

At 706, the first party cloud-based resource receives from the device to close the third party cloud-based resource. For instance, in the example of FIG. 1, the user may close the flight scheduling service upon receiving information associated with the arrival time of a specific flight. In some cases, the first party cloud-based resources may receive the request to close the third party cloud-based resource from the device, the process 700 may proceed to 708 and the first party cloud-based resources may notify the third party cloud-based resource of the request to close. In some cases, a token management module, such as token management module 206 of FIG. 2 may be notified of the user request to close the third party cloud-based resource as well.

At 710, the first party cloud-based resource initiates and assigns a counter to the third party cloud-based resource. For example, the first party cloud-based resource may initiate a counter to zero and assign the counter to the third party cloud-based resource and/or the device, the user, or the user's account. In some cases, the counter may be stored at the first party cloud-based resource together with an identifier associated with the third party cloud-based resource and an identifier associated with the user, the user's account, and/or one or more devices.

At 712, the first party cloud-based resource receives an audio announcement from the third party cloud-based resource. The audio announcement being intended to be output by a device associated with the user. For instance, in the example of FIG. 1, if there was a delay in departure of flight 134 from Detroit, the flight schedule service may send an audio announcement, such as "Arrival time for flight 134 from Detroit changed from 2:34 pm to 4:34 pm".

At 714, the first party cloud-based resource determines if the counter is less than a threshold. For example, the first party cloud-based resource may compare or test a value to ensure the value is within an acceptable range. In another example, the first party cloud-based resource may be configured to allow the third party cloud-based resource to send a limited number of audio announcement after the user closes the third party cloud-based resource. Thus, in this example, if the counter is less than the threshold, the process 700 proceeds to 716 and the first party cloud-based resource delivers the audio announcements to the device. Otherwise, the process 700 proceeds to 718 and the first party cloud-based resources deny the delivery of the audio announcements.

In some cases, the threshold may be based on the type of resource and/or the type of information sent to the user by the resource. For example, the threshold associated with the pizza order service of FIG. 2 may be relatively small such as a single audio announcements while the threshold associated with the flight schedule service of FIG. 1 may be relatively high such as five, as the flight status may change several times before arrival. In other cases, the threshold may be based on one or more user settings, account settings, a status of the third party cloud-based resource (e.g., trusted third party), a time of day the third party cloud-based resource was closed, a location of the user within the environment, a status of the device (e.g., on/off, in use, sleep, etc.), among others.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:
1. A system comprising:
one or more communication interfaces to communicate with one or more third party cloud-based resources and one or more end user devices;
one or more processors; and
computer-readable storage media storing computer-executable instructions, which when executed by the one or more processors cause the processors to:
receive, from an end user device, a user request to restrict use of a communication channel between the end user device and a first third party cloud-based resource, the communication channel to allow the first third party cloud-based resource to communicate with the end user device;
generate a first token configured to authorize the first third party cloud-based resource to cause the end user device to output an audio announcement;
notify the first third party cloud-based resource of the user request;
send the first token to the first third party cloud-based resource;
receive the audio announcement to output on the end user device;
receive a second token from a second third party cloud-based resource;
validate the second token by confirming that the second token is the first token;
authenticate the second third party cloud-based resource as an authorized user of the second token by determining the second third party cloud-based resource is the first third party cloud-based resource that the system sent the first token;
confirm the end user device is an authorized device associated with the second token by comparing the end user device to a list of devices associated with the first token; and
send data representative of the audio announcement to the end user device using the communication channel.

2. The system as recited in claim 1, wherein:
the end user device is a first end user device associated with a user account;
the computer-readable storage media stores computer-executable instructions, which when executed by the one or more processors cause the processors to provide the audio announcement to a second end user device associated with the user account; and
confirming the end user device is an authorized device associated with the token further comprises at least one of:
the user account related to the first end user device; or
determining that the second end user device is associated with an environment related to the first end user device by determining that the second end user device is within a location associated with the user account.

3. The system as recited in claim 1, wherein validating the token further comprises at least one of:
determining that a time elapsed since receiving the user request is less than a threshold amount of time; or
determining that a count associated with use of the token is below a threshold number of announcements.

4. A method comprising:
under control of one or more computer systems configured with executable instructions,
receiving, by at least one first party cloud-based resource from at least one third party cloud-based resource, data representative of a message to transmit to an end user device;
receiving, by the at least one first party cloud-based resource from the at least one third party cloud-based resource, a token to authorize transmission of the data;
determining, by the at least one first party cloud-based resource, that the token is valid;
determining, by the at least one first party cloud-based resource, the at least one third party cloud-based resource is an authorized user of the token; and
sending, from the at least one first party cloud-based resource, the data to the end user device.

5. The method as recited in claim 4, wherein determining that the token is valid comprises at least one of:
determining that less than a predetermined amount of time has elapsed since the token was granted to the at least one third party cloud-based resource; or
determining that a count associated with use of the token is below a threshold number of announcements, the count being incremented each time the data is sent to the end user device on behalf of the at least one third party cloud-based resource.

6. The method as recited in claim 4, wherein the end user device is a first end user device, and further comprising:
receiving from a second end user device a user request to close the at least one third party cloud-based resource;
sending a notification to the at least one third party cloud-based resource of the user request; and
sending the token to the at least one third cloud-based party resource, the token configured to authorize the at least one third party cloud-based resource to cause the first end user device to output the data.

7. The method as recited in claim 6, further comprising authenticating the first end user device as the authorized device associated with the token by at least one of:
determining that the first end user device is associated with the second end user device;
determining that the first end user device is associated with a user related to the second end user device;
determining that the first end user device is associated with a second account related to the first end user device; or
determining that the first end user device is associated with an environment related to the second end user device.

8. The method as recited in claim 4, further comprising authenticating the end user device as an authorized end user device associated with the token.

9. The method as recited in claim 4, further comprising converting the data from a text based format to an audio based format.

10. The method as recited in claim 4, further comprising:
receiving, from the end user device, a user request to close an established communication channel with the at least one third party cloud-based resource;
generating the token; and
sending the token to the at least one third party cloud-based resource of the user request.

11. A method comprising:
under control of one or more computer systems configured with executable instructions,
receiving, at least one first party cloud-based resource from an end user device, a user request to restrict an established communication channel with at least one third party cloud-based resource;
generating, at the at least one first party cloud-based resource, an authorization for the at least one third party cloud-based resource to cause the end user device to output audio announcements;
sending, from the at least one first party cloud-based resource, a notification to the at least one third party resource of the user request; and
sending, from the at least one first party cloud-based resource, an indication of the authorization to the at least one third party cloud-based resource.

12. The method as recited in claim 11, further comprising determining that the at least one third party cloud-based resource is authorized to cause the end user device to output at least one audio announcement.

13. The method as recited in claim 12, wherein determining that the at least one third party cloud-based resource is authorized to cause the end user device to output at least one audio announcement is based at least in part on at least one of:
a type of resource associated with the at least one third party cloud-based resource;
a type of service provided by the at least one third party cloud-based resource;
a type of device associated with the end user device; or
a location of the device associated with the end user device.

14. The method as recited in claim 11, further comprising determining an amount of time associated with the authorization is less than a threshold amount of time.

15. The method as recited in claim 11, further comprising determining a counter is less than a maximum number of audio announcements that the at least one third party cloud-based resource may cause the end user device to output, the counter being incremented each time an audio announcement is sent to the end user device on behalf of the at least one third party cloud-based resource.

16. The method as recited in claim 11, further comprising determining a set of end user devices to include in the authorization.

17. The method as recited in claim 11, further comprising:
receiving a particular audio announcement to output on the end user device from the at least one third party resource;
determining the at least one third party cloud-based resource has the authorization to cause the end user device to output the particular audio announcement; and
sending the particular audio announcement to the end user device.

18. The method as recited in claim 17, wherein determining the at least one third party cloud-based resource has the authorization to cause the end user device to output the audio announcement comprises determining that less than a predetermined amount of time has elapsed since the authorization was granted.

19. The method as recited in claim 17, further comprising storing data associated with the authorization and wherein the data is utilized to confirm that the at least one third party cloud-based resource has the authorization to cause the end user device to output the audio announcement.

20. The method as recited in claim 19, wherein storing the data includes storing at least one of:
- an identifier associated with the end user device;
- an identifier associated with the at least one third party cloud-based resource;
- an identifier associated with a user of the end user device;
- a time stamp associated with a time the authorization was granted;
- a time stamp associated with a time the authorization expires;
- a maximum number of audio announcements associated with the authorization;
- a number of audio announcements issued using the authorization; or
- one or more restrictions associated with the authorization.

* * * * *